United States Patent
Coggeshall et al.

(10) Patent No.: US 9,280,658 B2
(45) Date of Patent: Mar. 8, 2016

(54) SYSTEM AND METHOD FOR SYSTEMATIC DETECTION OF FRAUD RINGS

(71) Applicants: Stephen Coggeshall, Del Mar, CA (US); Bilal Shaw, San Diego, CA (US); Darwin Villagomez, San Diego, CA (US); Wenzhong Zhao, San Diego, CA (US)

(72) Inventors: Stephen Coggeshall, Del Mar, CA (US); Bilal Shaw, San Diego, CA (US); Darwin Villagomez, San Diego, CA (US); Wenzhong Zhao, San Diego, CA (US)

( * ) Notice: Subject to any disclaimer, the term of this patent is extended or adjusted under 35 U.S.C. 154(b) by 326 days.

(21) Appl. No.: 13/840,532

(22) Filed: Mar. 15, 2013

(65) Prior Publication Data

US 2014/0283094 A1    Sep. 18, 2014

(51) Int. Cl.
*G06F 21/50* (2013.01)
*G06F 21/31* (2013.01)
*G06F 21/55* (2013.01)
*G06Q 10/00* (2012.01)

(52) U.S. Cl.
CPC .............. *G06F 21/50* (2013.01); *G06F 21/316* (2013.01); *G06F 21/552* (2013.01); *G06Q 10/00* (2013.01)

(58) Field of Classification Search
CPC ..... G06F 21/50; G06F 21/316; G06F 21/552; G06Q 10/00
See application file for complete search history.

(56) References Cited

U.S. PATENT DOCUMENTS

| | | | |
|---|---|---|---|
| 7,458,508 B1 | 12/2008 | Shao et al. | |
| 7,562,814 B1 | 7/2009 | Shao et al. | |
| 7,686,214 B1 | 3/2010 | Shao et al. | |
| 7,793,835 B1 | 9/2010 | Coggeshall et al. | |
| 2006/0149674 A1 | 7/2006 | Cook et al. | |
| 2007/0027674 A1* | 2/2007 | Parson | G06N 5/025 704/9 |
| 2008/0140438 A1* | 6/2008 | Bares | 705/1 |
| 2008/0288407 A1* | 11/2008 | Hamel | G06Q 10/10 705/50 |
| 2011/0218877 A1* | 9/2011 | Barber | G06Q 10/00 705/26.35 |
| 2011/0251951 A1* | 10/2011 | Kolkowitz | G06Q 20/10 705/39 |
| 2012/0173570 A1* | 7/2012 | Golden | 707/769 |
| 2013/0024358 A1* | 1/2013 | Choudhuri | G06Q 20/4016 705/38 |
| 2013/0024376 A1* | 1/2013 | Choudhuri et al. | 705/44 |
| 2014/0012738 A1* | 1/2014 | Woo | G06Q 30/06 705/39 |

* cited by examiner

*Primary Examiner* — Chau Le
(74) *Attorney, Agent, or Firm* — San Diego IP Law Group LLP

(57) ABSTRACT

The present invention provides, in at least one embodiment, a system, and method for detecting fraud rings. The system gathers a small group of highly likely fraudsters. The system then looks for groups of these likely fraudsters who are interconnected. When the interconnections are strong, these groups are likely to be fraud rings. Once fraud rings are detected, the links can be applied to better prevent fraud and to help in criminal investigations.

12 Claims, 4 Drawing Sheets

| Ring | #Apps | #People | %Bankcard/Wireless/Retail | Ring type | Family or Friends | City |
|---|---|---|---|---|---|---|
| 12558 | 209 | 17 | 33/24/43 | Manipulation | Friends | Orlando, FL |
| 33546 | 116 | 18 | 4/95/1 | Manipulation | Family | Fort Worth, TX |
| 12146 | 82 | 9 | 5/89/6 | Manipulation | Friends | Shreveport, LA |
| 33702 | 51 | 6 | 11/16/73 | Theft | Family | Tampa, FL |
| 32947 | 95 | 12 | 12/69/19 | Manipulation | Family | Detroit, MI |

(each dot is a fraud ring)

FRAUD RING NO. 21570
Boynton Beach, FL area

| Name | Age | Details | Apps |
|---|---|---|---|
| Chastity | 33 | 3 SSNs, 2 LNs | 56 |
| Angel | 24 | 6 DOBs, 3 FNs | 30 |
| Ranni | 37 | 3 SSNs, 2 DOBs, 3 FNs | 29 |
| Herman | 24 | 2 FNs | 8 |
| Percy | 24 | 3 SSNs, 2 DOBs, 3 FNs | 7 |

Fig. 5

FRAUD RING NO. 3062
Indianapolis, IN area

| Name | Age | Details | Apps |
|---|---|---|---|
| Hattie Smith | 48 | 12 SSNs, 3 DOBs, 2 FNs, 3 LNs | 194 |
| Frank Smith | 75 | 7 SSNs, 5 DOBs, 2 FNs, 2 LNs | 117 |
| Dottie Smith | 71 | 2 SSNs, 3 DOBs, 4 FNs, 2 LNs | 10 |
| Freida Jones | 48 | 2 SSNs, 2 LNs | 24 |

Fig. 6

SYSTEM AND METHOD FOR SYSTEMATIC DETECTION OF FRAUD RINGS

BACKGROUND OF THE INVENTION

1. Field of Invention

The invention relates generally to fraud detection, and more particularly, to a technique for detecting fraud rings.

2. Description of Related Art

Identity fraud occurs when a person intentionally uses false personal identifying information in an attempt to represent himself as a different individual, who may or may not exist. This misrepresentation is often used in order to improperly obtain products or services. Identity fraud is not misrepresenting/hiding historical characteristics, such as past bad credit, but includes pretending to be a different person in order to avoid past bad credit.

It is estimated that over fifty (50) billion dollars have been lost by U.S. consumers and businesses annually since 2009 as a result of identity theft and fraud. The good news is that consumers are generally becoming more aggressive in monitoring, detecting, and preventing fraud with the help of technology and partnerships with financial institutions, government agencies, and identity theft protection companies. Numerous identity theft protection companies have been formed in recent years in order to provide subscribers with notifications to alert and resolve actual or potential identity misuse in, for example, credit applications, utility transactions, check orders, and payday loans, as well as provide resources to restore the subscriber's identity and recover any direct losses as a result of identity theft.

An identity fraud ring can be defined as a group of (two or more) people actively collaborating to commit identity fraud. The fraud ring can be an organized group of people, or companies, who defraud others. The fraud ring may be engaged any type of fraud, such as forgery, filing false claims, identity stealing, identity manipulation, counterfeiting checks, counterfeiting currencies, etc. Fraud can be classified as lost/stolen account fraud; identity theft; synthetic identity fraud, and identity manipulation. Like a legitimate non-fraud related business, by grouping together like minded individuals, the group is able to better achieve its goals, such as making more money, eluding detection, providing logistic aid to each other, diversify fraud strategies, etc.

Conventionally, attempts to prevent fraud rings are made by a team of professionals examining accounts unpaid accounts and seeing which accounts appear to be fraudulent and connected. These previous fraud ring discovery processes are ad hoc, not rigorous and substantially incomplete. The conventional approaches fall short because even when one member of the fraud ring is discovered, conventional approaches occur on such a small sample that it is easy for the remaining members of the fraud ring to remain undetected. Most importantly, these "one-by-one" discovery processes cannot systematically and deterministically find many, perhaps many thousands of rings.

SUMMARY OF THE INVENTION

The present invention provides, in at least one embodiment, a system, and method for detecting fraud rings. The system gathers a small group of highly likely fraudsters. The system then looks for groups of these likely fraudsters who are interconnected. When the interconnections are strong, these groups are likely to be fraud rings. Once fraud rings are detected, the results can be sorted and investigated, and can also be applied to better prevent further fraud.

In one embodiment, a system comprises: an events database comprising a plurality of events comprising at least fraudulent events; an identity resolution module configured to assign a person number to at least one of the plurality of events; a fraud database comprising people linked to the fraudulent events; and a fraud ring database comprising subgroups of connected fraudulent people connected by links, wherein the links are based on matching identity information, comprising a list of discovered fraud rings.

In another embodiment, a method comprises the steps of: receiving a plurality of events comprising at least fraudulent events; assigning a person number to at least one of the plurality of events; linking people to the fraudulent events; and linking fraudulent people, wherein the links are based on matching identity information, comprising a list of discovered fraud rings.

While some of these fraud rings are made up of what we might consider typical criminal "professionals," many others are seemingly innocuous people and appear to be just like someone's friends and neighbors. These identity fraud rings can include family members or groups of friends. Family group rings that that have been observed include parents, siblings, spouses, aunts and uncles, often using the same address and improperly sharing their personal identity information. Personal identity information can include name, address, social security number, date of birth, phone number, etc. In some cases, a family group will bond with friends who have close family associations to increase the reach of their identity fraud activities.

According to a new study by ID Analytics', there are more than 10,000 identity fraud rings in the U.S. This study is the first to systematically find many thousands of identity fraud rings, which was accomplished by developing an algorithmic, deterministic approach capable of automating the process of examining the interconnections between identity fraudsters to uncover rings of organized activity.

This automated approach represents a fundamentally important step forward in understanding and preventing identity fraud. In the past, research on fraud rings was conducted through manual spot checks and investigations of vast amounts of data, which uncovered a limited number of fraud rings. Embodiments of the present invention now, for the first time, employ a deterministic process for finding many thousands of identity fraud rings.

The study examined more than a billion applications for bankcards, wireless services and retail credit cards and found identity fraud rings attacking all three industries, with wireless carriers suffering from the most fraudulent activity. According to the study, Georgia, Florida and South Carolina are noted hotbeds of fraudulent activities across all three industries. An analysis of the results can be used to improve existing identity fraud prevention and protection products and services.

One application of the invention is to create lists of the identity information gleaned from the known fraud rings. For example, a list of known fraudulent people, addresses, phone numbers, emails, SSNs, etc. can be compared to a current event or an existing portfolio of people (e.g., a business' customer list). The list can also be used to create new variables (e.g., types of fraud) for existing fraud models or new attributes (e.g., "is linked to a known fraud ring").

Another application of the invention is to create lists of discovered fraud rings along with summary characteristics, such as number of people, type and amount of fraud activity, method of fraud, dollar loss, etc. These lists can be sorted by any combination of these features to create lists of prioritized entities for law enforcement, state and or federal, to optimize investigative efforts.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows:

FIGS. 5-6 each illustrate exemplary fraud rings according to embodiments of the invention.

DETAILED DESCRIPTION OF EMBODIMENTS

Figure 1:
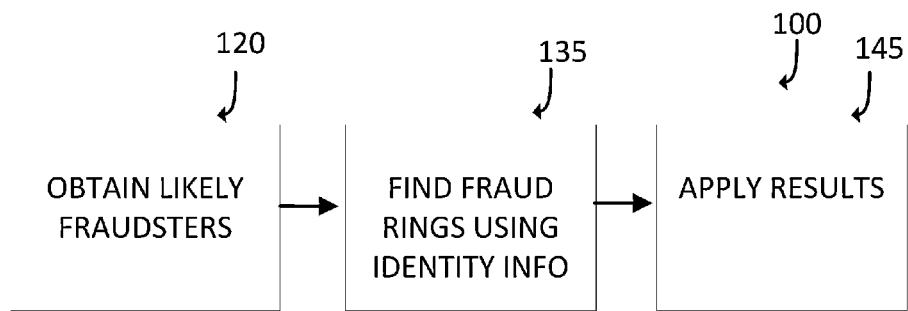
FIG. 1 illustrates a high level diagram of a fraud ring detection system according to an embodiment of the invention.

Further features and advantages of the invention, as well as the structure and operation of various embodiments of the invention, are described in detail below with reference to the accompanying FIGS. 1-7, wherein like reference numerals refer to like elements. Although the invention is described in the context of a plurality of modules, one of ordinary skill in the art readily appreciates that the present invention can be implemented with more or fewer modules (e.g., a single module).

The present invention provides, in at least one embodiment, a system, and method for detecting fraud rings. The system gathers a small group of highly likely fraudsters, and makes note of the identity information which they use (e.g., name, social security number, email, etc.), whether the information is accurate or not. The system removes identity information that is likely to result in a false positive match to other likely fraudsters, such as commonly used false identity information (e.g., phone number 800 555 1212, name "test"). The system then looks for groups of these likely fraudsters who are interconnected by assembling individuals who use similar or identical personal information (SSN, phone number, address, etc.). When the interconnections (e.g., links, matches, shared identity information, etc.) are sufficiently strong, these individuals are likely communicating and are thus highly likely to be fraud rings. Once fraud rings are detected, the links can be applied to current applications for credit and other uses to better prevent fraud.

ID Analytics, Inc. (a wholly owned subsidiary of LifeLock, Inc.) utilizes its proprietary ID Network®—the only real time, cross-industry compilation of identity information—to glean insight into consumer identity behavior. The ID Network has grown to include over 700 billion aggregated identity attributes ("characteristics"), 2.9 million reported frauds, and 1.7 billion consumer transactions. The ID Network receives an average daily flow of over 45 million attributes via a constant stream of input from its members, including leading financial institutions, retailers, wireless providers, credit card issuers, auto and mortgage lenders, and other issuers of credit. This insight reveals, among other things, anomalous and potentially fraudulent activity. Every day, the largest U.S. companies and critical government agencies rely on ID Analytics to make risk-based decisions that enhance revenue, reduce fraud, drive cost savings and protect consumers.

ID Analytics has also developed and implemented an ID Score, which is a numeric value ranging from 001-999 and reflects the risk-level associated with a consumer's identity, i.e., the likelihood the consumer has been victimized by an identity thief—the greater the score, the greater the risk. The ID Score relies on data within the ID Network and provides an integrated view of each individual's identity characteristics and their connectedness to others' identity characteristics. These identity characteristics include, among other possible pieces of consumer data, Social Security number (SSN), name, address, home phone number, date of birth, cell phone number, e-mail address, and Internet Protocol (IP) address. The ID Score helps organizations effectively pinpoint first-party fraud, synthetic identities, identity manipulation and identity theft in real time. The technology behind the ID Network, ID Score, and applications thereof are discussed in United States Patent Application Publication No. 2006/0149674; and U.S. Pat. Nos. 7,458,508; 7,562,814; 7,686,214; and 7,793,835, the entire disclosures of which are all incorporated by reference herein. By applying advanced analytics to data within the ID Network, ID Analytics can quantitatively evaluate millions of desirable and suspicious behaviors and relationships in real time to understand identity risk. These analytics generate immediate and actionable insight including the authenticity of an identity, an applicant's creditworthiness, or a consumer's exposure to identity theft.

FIG. 1 illustrates a high level diagram of a fraud ring detection system 100 according to an embodiment of the invention. The system 100 can be used to systematically find many thousands of fraud rings operating in the U.S. As described further below, by starting with a core group of known fraudsters, for example, several million known fraudsters operating in the U.S., the system 100 builds the interconnections between these known fraudsters. The system 100 focuses only on the fraudsters who have at least one connection to another fraudster, putting aside for the time being the "singletons"—fraudsters who appear at this time to be acting alone. The resulting list of identified fraud rings can be used in many ways.

At module/database 120, the system 100 gathers a small group (perhaps several million) of highly likely fraudsters. The highly likely fraudsters may also be referred to as known fraudsters, likely fraudsters, likely bad people, etc. The fraudsters may be considered "known" or "likely" because they have an individual risk score, outputted by a fraud detection system, above a certain threshold. However, the fraudsters can be added to this group for other reasons as well (e.g., a conviction or an admission of fraud).

In module/database 135, the system looks for groups of likely fraudsters within this small group. The groups are obtained by finding likely fraudsters who are linked to other likely fraudsters. This link (also referred to as a match, shared information, interconnection, etc.) is a match between their personal identity information (e.g., one or more names, addresses, phone numbers, emails, social security numbers, etc.). For example, two or more likely fraudsters, who use the same mailing address, phone number, and email for applications, are likely to be connected, and this connection is likely to be a fraud ring.

These groups of linked likely fraudsters, now seen as fraud rings, are then augmented by expanding the linking via the described identity elements (e.g., phone number, SSN, address, etc.) to the entire universe of people seen, that is, now including all people, not just the small group of likely fraudsters. This expansion of each ring will now include people who by themselves look good (i.e., not a likely fraudster), but are now seen to be linked to a known fraud ring. In this expansion process we have now found all the visible activity of each fraud ring, some of which now will include fraud victims. These victims can be separated from the likely fraudsters through application of algorithms to identify victims verses fraudsters.

Module 135 finds likely (i.e., known) fraud rings. But in addition to finding the fraud rings, and just as important, module 135, finds the identity information that links the likely fraud ring members together. We now know what information is being shared and how within each fraud ring. For example, we will see 10 fraudsters using 3 addresses in common, or a particular phone number in common.

Module 145 applies the results from module 135. In one application, the identity information shared between the fraud ring members can be used to compare to a new application (that is, a current event). In this application, when a person completes a new application (e.g., for credit), the system 100 compares the identity information (e.g. name, address, phone number, email, social security number, etc.) in the new application to the identity information shared by a known fraud ring. If there is a match, this increases the risk of the current application, since there is some type of associated identity information with a known fraud ring. Additional uses are discussed in reference to FIG. 2.

Figure 2:
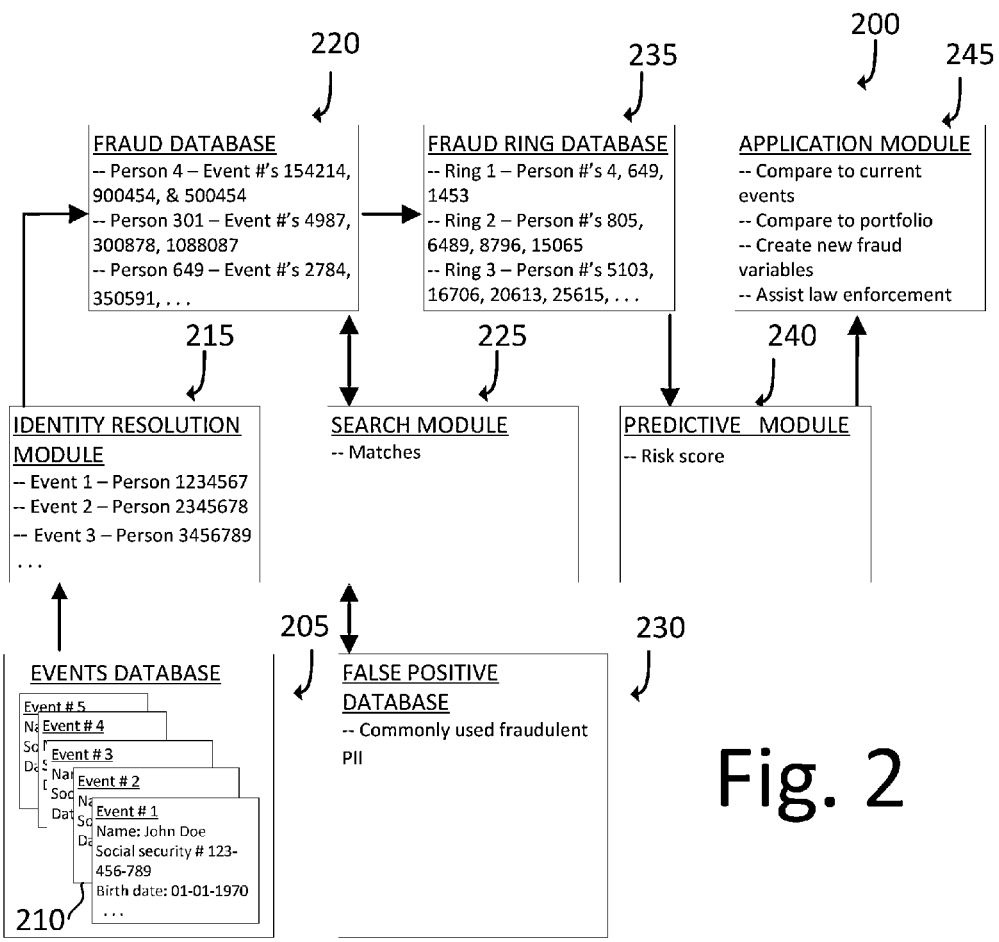
FIG. 2 illustrates a fraud ring detection system according to an embodiment of the invention.

FIG. 2 illustrates a fraud ring detection system 200 according to an embodiment of the invention. The system 200 includes an events database 205 with historical events 210, an identity resolution module 215, a fraud database 220, a search module 225, a false positive database 230, a fraud ring database 235, a predictive module 240, and application module 245. The system 200, compared to the system 100, provides additional detail and embodiments.

The events database 205 (e.g., historical module) contains identity information from prior events 210. The prior events 210 can include applications for products and services from a large numbers of consumers in ID Analytics identity network, although in other embodiments can be defined as just the prior applications that match or are similar to a particular application. The prior applications 210 can include both applications of fraudsters and non-fraudsters.

The identity resolution module 215 (e.g., identity resolution machine) assigns a specific person, represented by a PIN number, to each event. The module 215 is sorted by events. The results of the identity resolution module 215 output into the fraud database 220.

The fraud module/database 220 is sorted by people. Whereas the events database comprises a listing of event records, the system 100 now has information sorted at the "person level." This is important, because now all activity and variation of personal identity information can be seen per person. Like the module/database 120, the database 220 can be used to obtain likely fraudsters (also referred to as "known fraudsters").

The search module 225 leverages the false positive database 230 to remove false positives from the fraud database 220. A likely false positive is identity information (names, addresses, social security number, etc.) that is more likely to result in a mistake. For example, a name of a kiosk, a business address, or other common frivolous addresses, phone numbers or emails.

The search module 225 searches for and removes false positive identity information. The false positive identity information in the false positive database 230 are removed from the fraud database 220 because they are so commonly used for non-fraud activity, they can incorrectly connect people that are not realistically connected. This helps to assure that the discovered fraud rings meet the requirement of people who are actively and intentionally collaborating.

The fraud ring module/database 235, like the module/database 135, contains lists of groups of two or more connected people that are likely fraudsters. The groups are obtained by finding likely fraudsters who are substantively linked to other likely fraudsters, which meets our definition of fraud rings. A recent ID Analytics study revealed the existence of over 10,000 identity fraud rings through a systematic ring discovery process.

The predictive module 240 outputs a risk score. In one embodiment, the risk score represents the likelihood that the event being scored is associated with fraud. In other embodiment, the score represents the likelihood that a person or event is associated with a fraud ring. These calculations are made by examining whether or not and how the event being scored is linked to the set of known fraud rings 235.

The application module 245, like the module 145, applies the results of the fraud ring detection from the predictive module 240 and the fraud ring database 235. In addition to the application described above with reference to module 145, another application of the module 245 uses the identity information shared by the fraud rings to compare it to an existing portfolio of people and their identity information. For example, a business or government organization may have a list with many millions of identity information (e.g., people, addresses, phone numbers), and might want to know if there are any known members of a fraud ring in their portfolio.

The module 245 can also use identity information shared by the fraud rings to create new variables in existing fraud detection models. These new variables can be links of various types and strengths with known fraud rings. There are many types of identity fraud, such as lost/stolen account fraud; identity theft; synthetic identity fraud, and identity manipulation.

The module 245 can be used to create new attributes that can be sold as part of a fraud detection model. These new attributes can include phrases like "is linked to a known fraud ring," "strength of linkage to a known fraud ring," "type of linkage to a known fraud ring," etc. Further, the module 245 can be used to provide a list of high return on investment targets for law enforcement to investigate.

The module 245 can also be used to find interrelated "bad" people of other kinds, such as felons, registered sex offenders, credit delinquent customers, etc. One can use this system 200 to build lists of entities (e.g., people, addresses, phone numbers, emails, etc.) associated with collaborating "bad" people for many general purposes including national security.

The module 245 can be used for marketing applications. For example, the system 200 can create lists of groups of interconnected people with any characteristic that might be of interest to marketing processes, such as interconnected people with high incomes, similar education, similar household characteristics, similar uses of or affinities to particular products or services, recent product cancellations.

Figures 3, 4:
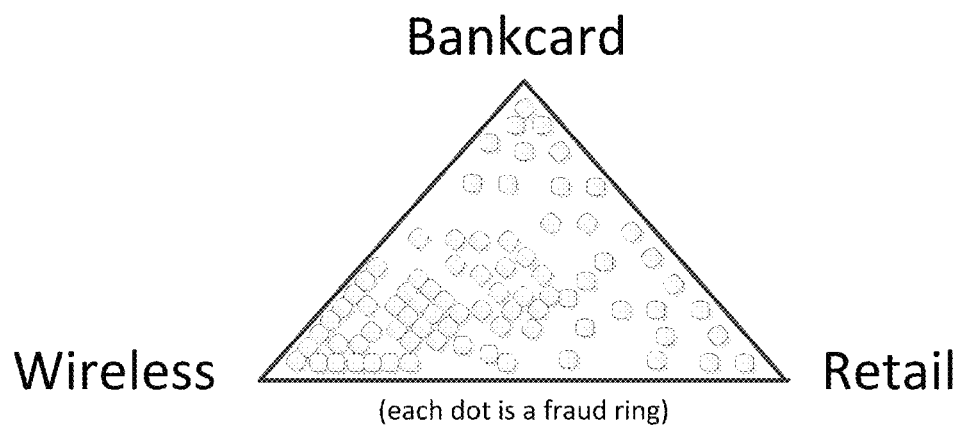
FIG. 3 illustrates statistics on some exemplary fraud rings according to an embodiment of the invention.
FIG. 4 illustrates a breakdown of fraud rings in three main industries according to an embodiment of the invention.

FIG. 3 illustrates statistics on some exemplary fraud rings according to an embodiment of the invention. Surprisingly, although it is often assumed that professionals are the masterminds behind identity fraud rings, a large number of fraud rings consist of small groups of family and/or friends. Among that group, many families are working together in fraud rings using each other's social security numbers and dates of birth, as well as committing a combination of identity theft (stealing someone's identity) and identity manipulation (improperly modifying their own personal identity information).

FIG. 4 illustrates a breakdown of discovered fraud rings in three main industries according to an embodiment of the invention. ID Analytics has found that these criminals are most likely to target three main industries, focusing on the bankcard, wireless, and retail card industries, with wireless carriers suffering from the most fraudulent activity.

Although fraud rings can be found throughout the U.S., the study indicates that there are distinct hotbeds for fraud rings in particular locations in the U.S., that reveals a belt of fraud extending from Virginia, through the Carolinas, across Georgia and Florida, reaching Alabama and Mississippi. And, while many fraud rings operate in cities, a surprisingly high number of rings operate in rural areas as well. ID Analytics uses, in one embodiment, the fraud ring data to apply onto a geographic map, such as a map of the USA, with color coding per zip code to see which areas are high, medium, or low risk of having identity fraud rings. Other monikers can be used as well, such as not risky, over 60% risk score, over risk 90%.

FIGS. 5-6 each illustrate exemplary fraud rings according to embodiments of the invention. FIG. 5 illustrates a discovered fraud ring that is mostly family based (all same last name), and focused on identity manipulation type fraud. There are five people, 130 applications (Apps) between them, and only one address. The people share and manipulate (change digits of) social security numbers, dates of birth, and names.

FIG. 6 illustrates a fraud ring that is a combination of family and friends and which is focused on identity manipulation type fraud. There are four people, with 345 credit card applications, 1 payday loan observed from these four fraudsters from two addresses. Frank is a retired professor and uses his college email. The group initially just included three of the four, and "Freida" joined later.

Figure 7:
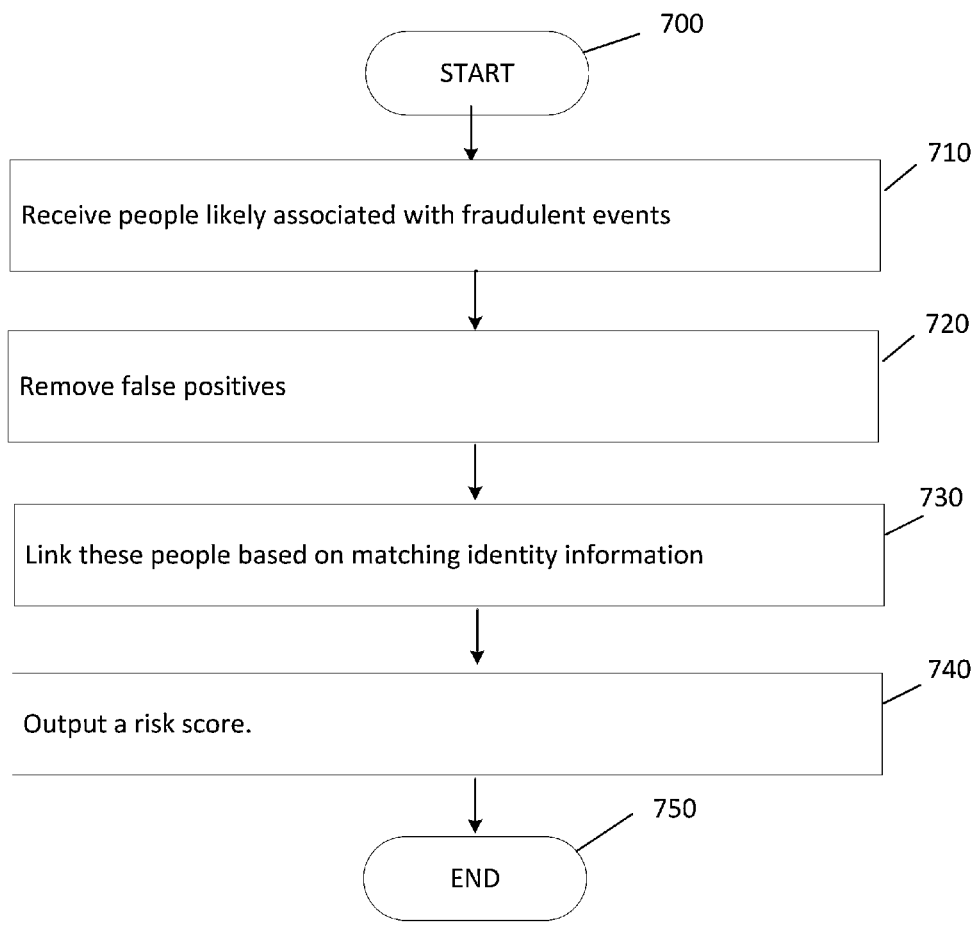
FIG. 7 illustrates a process of detecting a fraud ring according to an embodiment of the invention.

FIG. 7 illustrates a process of detecting fraud rings according to an embodiment of the invention. The process starts at step 700. At step 710, the fraud database 220 receives people likely associated with fraudulent events. The database 220 includes the people and their associated identity information. At step 720, the search module 225 removes false positive identity information. This is information that may be commonly used by many people in non-fraud activity and shouldn't be considered when looking for fraudulent links, as described previously. Then, at step 730, the fraud ring database 235 links the identity characteristics of these people based on matching identity information. The predictive module 240 outputs a risk score at step 740. The process may be repeated recursively a number of times, additional people from the remaining "non-likely fraud" universe may also be linked, and the process ends at step 750.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A system comprising:
    an events database comprising a plurality of events comprising at least fraudulent events;
    an identity resolution module comprising an identity resolution machine adapted to assign a specific person, represented by a PIN number, to a plurality of events in said events database, and sorts the events by the resulting PIN numbers for output to the fraud database, and configured to assign a person number to at least one of the plurality of events;
    a fraud database comprising people linked to the fraudulent events;
    a false positive database comprising identity information that should not be included in linking people;
    a search module that searches for matches between the identity information in the false positive database and the identity information of the people linked to the fraudulent events; and
    a fraud ring database comprising subgroups of connected fraudulent people connected by links, wherein the links are based on matching identity information, comprising a list of a plurality of discovered fraud rings.

2. The system of claim 1 further comprising a predictive module which computes a risk score based on the matching identity information, wherein the risk score represents a chance that a fraudulent first person and a fraudulent second person form a fraud ring.

3. The system of claim 1 further comprising an application module, wherein the application module compares the matching identity information to a current event.

4. The system of claim 1 further comprising an application module, wherein the application module compares the matching identity information to a portfolio.

5. The system of claim 1 further comprising an application module, wherein the application module creates a rank-ordered list of discovered fraud rings along with summary information to be provided to interested parties such as law enforcement.

6. The system of claim 1 further comprising an application module, wherein the application module compares the matching identity information to people with non-fraud related attributes.

7. The system of claim 6, wherein the non-fraud related attributes comprise felonies, registered sex offenses, or credit delinquencies.

8. The system of claim 6, wherein the non-fraud related attributes comprise a particular level of income, a particular level of education, household characteristics, affinity to a particular product or service, or a product cancellation.

9. A method comprising:
    receiving a plurality of events at an events database comprising at least fraudulent events;
    assigning, by an identity resolution machine, a person number to at least one of the plurality of events;
    linking people to the fraudulent events;
    forming a false positive database comprising identity information that links a plurality of people who do not form a fraud ring;
    searching for matches between the identity information in the false positive database and the identity information of the people linked to the fraudulent events; and linking fraudulent people, wherein the links are based on matching identity information, comprising a list of a plurality of discovered fraud rings.

10. The method of claim 9 further comprising computing a risk score based on the matching identity information, wherein the risk score represents a chance that the fraudulent first person and the fraudulent second person form a fraud ring.

11. The method of claim 9 further comprising comparing the matching identity information to a current event.

12. The method of claim 9 further comprising the matching identity information to a portfolio.

* * * * *